(No Model.) 3 Sheets—Sheet 2.

L. ANDERSON.
MACHINE FOR POINTING SKEWERS.

No. 250,700. Patented Dec. 13, 1881.

WITNESSES
INVENTOR
Leonard Anderson
By Leggett & Leggett
ATTORNEYS (No Model.)

3 Sheets—Sheet 3.

L. ANDERSON.
MACHINE FOR POINTING SKEWERS.

No. 250,700.

Patented Dec. 13, 1881.

WITNESSES

INVENTOR
Leonard Anderson
By Liggett & Liggett
ATTORNEYS

UNITED STATES PATENT OFFICE.

LEONARD ANDERSON, OF PAINESVILLE, OHIO, ASSIGNOR TO E. H. JOHNSON, OF SAME PLACE.

MACHINE FOR POINTING SKEWERS.

SPECIFICATION forming part of Letters Patent No. 250,700, dated December 13, 1881.

Application filed March 21, 1881. (No model.)

*To all whom it may concern:*

Be it known that I, LEONARD ANDERSON, of Painesville, in the county of Lake and State of Ohio, have invented certain new and useful Improvements in Machines for Pointing Skewers; and I do hereby declare the following to be a full, clear, and exact description of the invention, such as will enable others skilled in the art to which it pertains to make and use it, reference being had to the accompanying drawings, which form part of this specification.

My invention relates to a machine for pointing skewers; and it consists in the following parts and combination of parts, as hereinafter specified and claimed.

Figure 1:
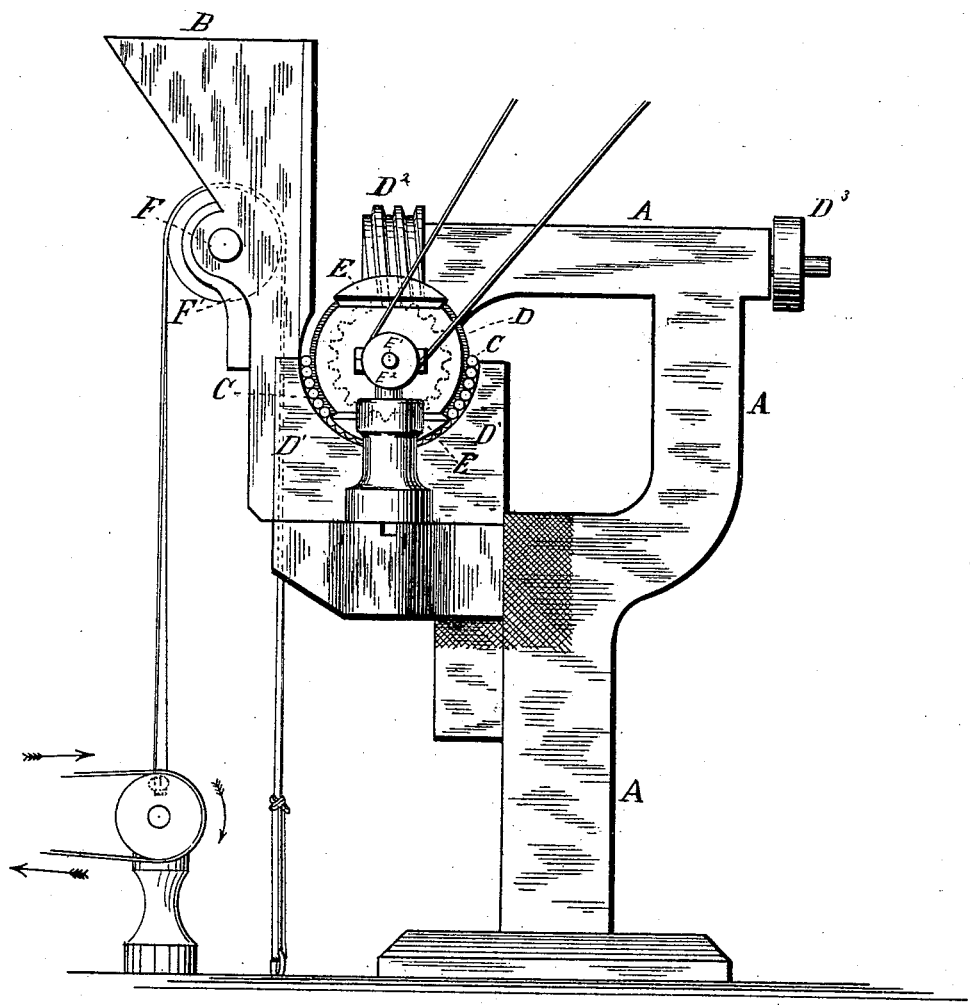
Figure 2:
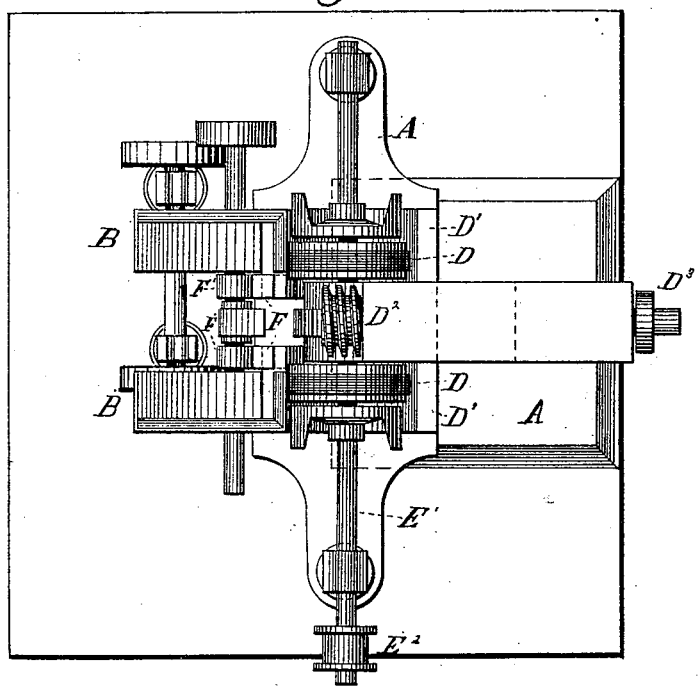
Figure 3:
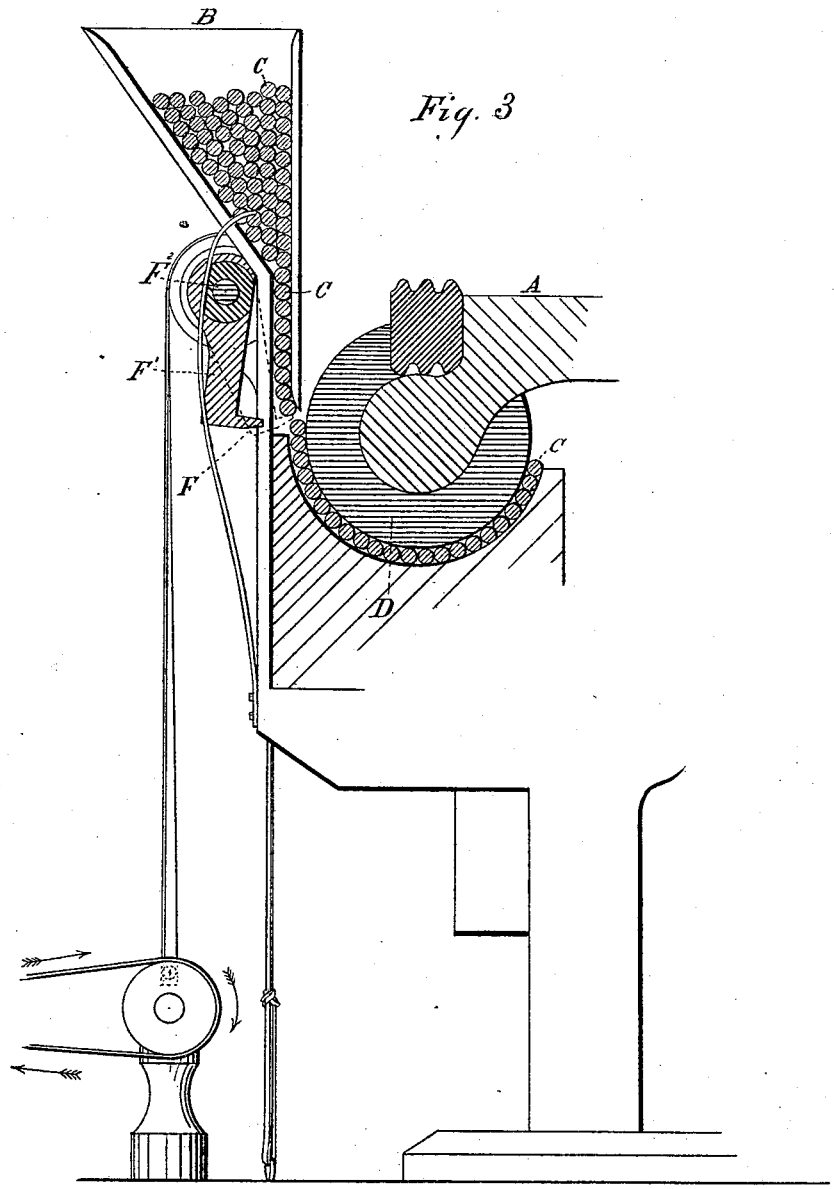

In the drawings, Figure 1 is a view in side elevation of my device, and Fig. 2 a plan view thereof. Fig. 3 is a detached view, showing the construction and adaptation of the feeding-fingers F F.

A is a frame, of any suitable construction, dimensions, and material, for holding and accommodating the various working parts of my device.

B is the hopper for receiving and feeding the skewer-blanks C.

D is the skewer-feeder. This feeder consists of two disks clothed with rubber, leather, or any material that will afford sufficient friction. The feeders D revolve within a semicircular trough, D', of a greater diameter than that of the feeders D. The skewer-blanks C, as indicated in Fig. 1, are received between the trough D' and the periphery of the feeders D, and the revolution of the feeder is such as to slowly carry the skewers from the hopper side of the trough to the opposite or discharging side thereof. Meanwhile the skewers are revolved upon their own axis by being rolled between the feeder and their trough. Motion is imparted to the feeding-wheels D (which are loosely placed upon the shaft or axis of the cutters) by suitable worm-gear or other connection, D², actuated by the pulley D³ by means of suitable belt or other connection.

E E are revolving cutters, operating upon the principle of the revolving planing-machine. These cutters are carried upon a common shaft, E', driven by pulley E².

F F are feeding-fingers. They are carried by arms F', and are fixed upon a common shaft, F², and this shaft, by any suitable means, is to be given a reciprocating or to-and-fro motion, so that a like movement is imparted to the feeding-fingers F F. At each forward movement of the feeding-fingers a skewer-blank is pushed from the feeding-hopper B between the feeders D and trough D'.

As already mentioned, the feeding-wheels D are given a slow revolving motion, while the cutters E have a revolving motion sufficiently rapid for the performance of their functions.

The knives upon the cutters E are so constructed and adjusted as to give a tapering or pointing cut to the projecting ends of the skewer-blanks, which are of sufficient length to extend laterally beneath the blades of the cutters E and be by them pointed.

The operation of my machine is as follows: The hopper B is filled with skewer-blanks, and the feeding-fingers F, at each forward movement, feed a blank between the wheels and trough D'. The wheels D, revolving slowly, not only carry forward the skewer-blank, but roll it upon its own axis. As it comes within reach of the cutters E each end of the skewer-blank is pointed, after which it is discharged at the other end of the trough D'.

I do not of necessity limit my invention to the employment of two feeding-wheels, D, as a single one, or more than two, might be employed.

I am aware that it is not new to provide a machine for making skewers wherein the cutter is constructed to sever the stick at its central portion and point the adjacent ends, and saws for cutting off the outer ends of the sticks to produce skewers uniform in length. In such construction of machine the sticks are supported on a vertically-adjustable concave block and fed forward by means of hoops or metal bands loosely encircling the cutter-shaft and driven by belts, and hence I make no claim to such a construction and combinations of parts.

What I claim is—

1. The combination of the worm or equivalent gear $D^2$, skewer-feeders D, circular trough D', and cutters E E, substantially as and for the purposes shown.

2. The combination, with the skewer-feeder D and circular trough D', of the hopper B, arm F, provided with a finger, F', and devices for actuating said arm to regulate the feed of the skewer-sticks, substantially as set forth.

In testimony whereof I have signed my name to this specification in the presence of two subscribing witnesses.

LEONARD ANDERSON.

Witnesses:
SEXTUS SLOAN,
S. MOODEY.